Fig. 1.

INVENTOR.
GEORGE M. BOOTH
BY
John P. Harvey
ATTORNEY

United States Patent Office 3,517,284
Patented June 23, 1970

3,517,284
HIGH SENSITIVITY SOLID-STATE SERVO MOTOR CONTROL SYSTEM
George M. Booth, Jensen Beach, Fla., assignor to Wallace & Tiernan Inc., East Orange, N.J., a corporation of Delaware
Filed Oct. 2, 1967, Ser. No. 672,225
Int. Cl. G05b 11/12
U.S. Cl. 318—18                  5 Claims

ABSTRACT OF THE DISCLOSURE

A high sensitivity control for an alternating current reversible electric motor, in which the energization of the motor is controlled by a pair of threshold responsive control means, e.g., silicon controlled rectifiers, whose control electrodes are supplied with an actuating signal which is the sum of three component potentials, namely:

(a) an alternating control signal responsive to a variable condition and appearing in a given phase or the opposite phase depending upon the desired direction of motor operation, and varying in amplitude in accordance with the desired speed of motor operation;

(b) a background potential derived from the AC power source and varying at twice the source frequency, and having a fixed value at the beginning of each half-cycle of the source substantially more negative than the threshold potential effective to trip the threshold responsive control means, said background potential being effective in the absence of a control signal to energize the motor winding in substantially equal pulses and alternately in opposite senses in succeeding half-cycles; and (c) a feedback potential supplied from the motor circuit and effective to introduce a negative (speed reducing) feedback whenever the motor is running.

---

The present invention relates to high sensitivity electrical motor control systems. While the invention has utility in numerous and diverse applications, it has particular utility in high gain electrical servo systems and will be described in that environment.

It is an object of the invention to provide a new and improved electrical motor control system having such stability of its operational characteristics and such high sensitivity to an applied electrical control signal as to enable a high degree of sensitive control over both the selection of one of two directions of rotation of the motor and over the power energization of the motor in each selected direction of rotation.

It is a further object of the invention to provide a high gain electrical servo-motor system of the closed loop type useful in effecting the positioning of a movable follower member with a high degree of precision and in response to a small electrical control signal generated by a movable member to be followed, and one in which the precision of such positioning is relatively unaffected by prevailing operational conditions such as changes of ambient temperature, changes of power supply voltage, and aging of components of the system.

It is an additional object of the invention to provide a novel high-gain electrical servo-motor system of simple and relatively inexpensive construction, and one which is suitable for a variety of applications utilizing either a direct-current or an alternating-current servo motor as desired while providing for either type of motor such sensitivity of control by an electrical control signal as to insure in the vicinity of zero amplitude of the signal appreciably greater power energization of the motor than would be effected in direct proportion to the near-zero amplitude of the control signal.

Other and further advantages of the invention will appear as the detailed description thereof proceeds in the light of the drawings forming a part of this application and in which.

Figure 1:
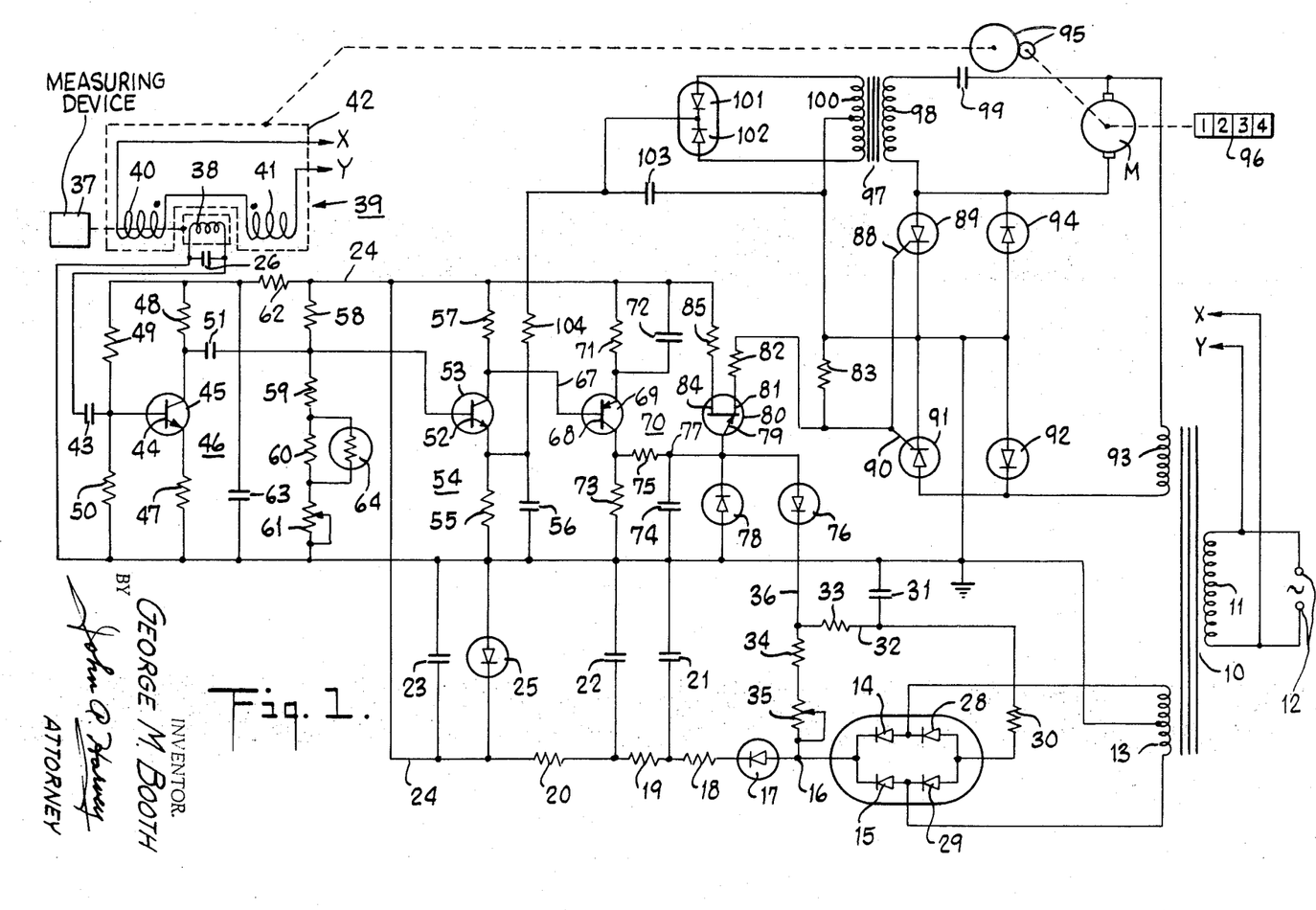
FIG. 1 is an electrical circuit diagram showing the arrangement of a high gain electrical servo-motor system embodying the present invention in a particular form.

Referring now more particularly to FIG. 1, which as previously noted is the electrical circuit arrangement of a high gain electrical servo-motor system embodying the present invention in a particular form, energization of the system is effected by means providing a source of alternating current of reference phase. This means in particular is comprised by a power transformer 10 having a primary winding 11 energized through input terminals 12 from a source of alternating current which may conveniently be of sixty cycle or higher frequency as desired. This alternating current energization provides an operational reference phase, represented by curve A of FIG. 2, for the system as will presently become more fully apparent.

Figure 2:
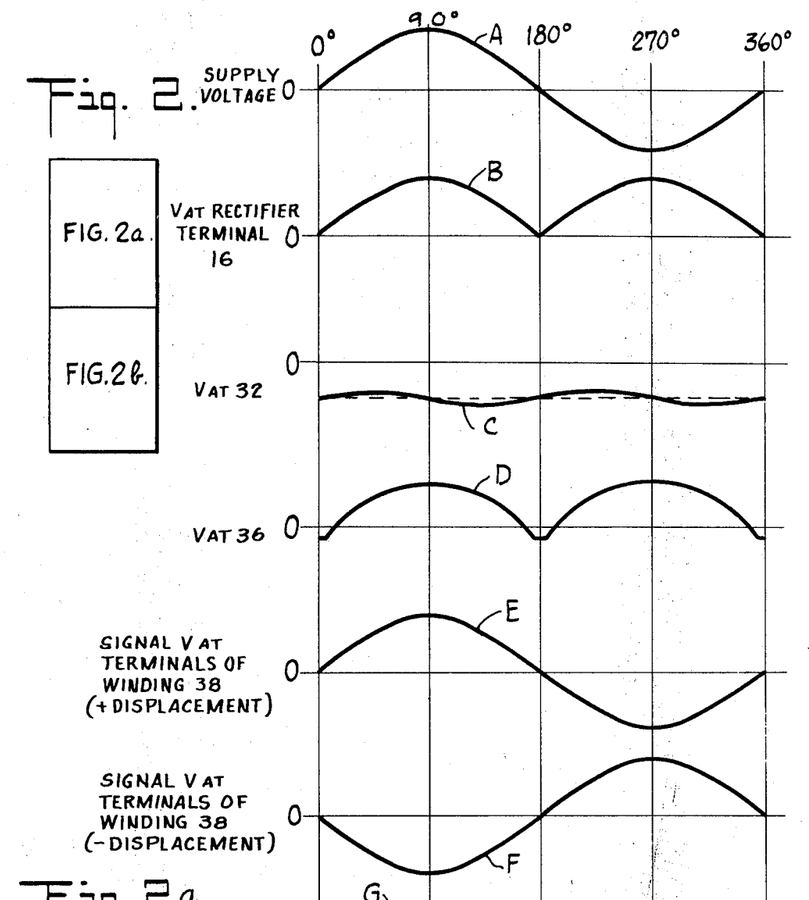
FIGS. 2a–2b arranged as in FIG. 2 graphically represent certain voltage relationships occurring at selected points in the FIG. 1 system and are used as an aid in explaining the operation of the invention.

The transformer 10 includes a secondary winding 13 having a center terminal connected to ground potential and having end terminals connected to a first full wave rectifying system comprised by diode rectifiers 14 and 15 connected as shown to a rectifier output terminal 16 at which there is developed a full-wave-rectification positive potential represented by curve B of FIG. 2. This positive rectification potential is supplied through an isolating diode rectifier 17 to a filter network comprised by series resistors 18, 19 and 20 and shunt condensers 21, 22 and 23 to develop in a rectifier output circuit conductor 24 a filtered unidirectional power supply potential conventionally regulated in amplitude by a Zener diode 25 connected between the conductor 24 and ground.

The end terminals of the secondary winding 13 of the transformer 10 are also connected to a second full wave rectifier system comprised by diode rectifiers 28 and 29 which are connected in common through a series filter resistor 30 to a shunt filter condenser 31 to provide in a rectifier output line 32 a partially filtered unidirectional potential of negative polarity with respect to ground potential as represented by curve C of FIG. 2. This negative polarity potential is connected through series-connected resistors 33, 34 and 35 with the full wave rectification positive potential developed at the rectifier output conductor 16 and isolated by the diode 17 from the power supply unidirectional potential. The combined effects of these two potentials provide at a conductor 36, connected to the juncture of resistors 33 and 34, a background potential of a desired waveform and voltage level as represented by curve D of FIG. 2. The resistor 35 is of the manually adjustable type to adjust the level of the control voltage to suit particular operating conditions hereinafter explained more fully.

The servo system of FIG. 1 is shown by way of illustration as one for indicating the prevailing value of a condition to be indicated by a measuring device 37, such as a differential pressure measured by an aneroid pressure sensitive capsule. To this end, the device 37 is mechanically connected to a movable secondary winding 38 of a differential transformer form of transducer 39 and effects linear movement of the winding 38 to an extent and in a direction corresponding respectively to the prevailing value and change of value of the condition to be indicated. This movement of the winding 38 is accomplished with infinitesimal effort by the device 37 and is independent of the structure of the transducer 39 which may be of the type more fully disclosed and described in the concurrently filed application of George M. Booth, Ser. No. 672,040, filed Oct. 2, 1967, now Pat. No. 3,454,854, issued July 8, 1969, and which is assigned to the same assignee as the present application. The transducer 39 includes a pair of primary exciting windings 40 and 41 which are fixedly supported upon a movable follower carriage structure indicated by the broken line box 42. These windings are connected in series with opposing magnetic fields, as indicated by the magnetic polarity dots, to the source of alternating current of reference phase supplied to the input terminals 12. When the secondary winding 38 is positioned in the center of symmetry of the magnetic fields of the primary windings 40 and 41, the latter induce balancing voltages so that no voltage appears at the terminals of the secondary winding. However, displacement of the secondary winding 38 to one side or other of such center of magnetic field symmetry unbalances the induced voltages, causing a voltage to appear at the terminals of the secondary winding 38. This secondary terminal voltage is hereinafter referred to for convenience as an error signal. As graphically represented by curves E and F of FIG. 2, the inductance of the primary windings 40 and 41 is sufficiently large that in conjunction with a condenser 26 connected in shunt to the secondary winding 38 the error signal has a phase the same as (curve E) or opposite to (curve F) that of the alternating current of reference phase supplied to the input terminals 12 (curve A) depending upon the displacement of the secondary winding 38 by the device 37 to a position where it is closer to one or the other of the primary windings 40 or 41. The amplitude of this error signal increases with increasing displacement of the pickup winding 38 from the center of symmetry of the magnetic fields produced by the primary windings 40 and 41, and in practice may have a peak-to-peak amplitude value of the order of 0.2 millivolt R.M.S. per one-thousandth inch displacement of the winding 38 from such center of symmetry.

The error signal induced in the secondary winding 38 is coupled through a condenser 43 to the base electrode 44 of an NPN transistor 45 included in a conventional transistor amplifier stage 46 having an emitter temperature stabilizing resistor 47, a collector load resistor 48, and a base bias potential divider comprised by series connected resistors 49 and 50. The amplified error signal is coupled through a condenser 51 to the base electrode 52 of an NPN transistor 53 included in a conventional transistor amplifier stages 54 having an emitter bias network comprised by a resistor 55 and shunt connected condenser 56, a collector load resistor 57, and a base electrode bias network comprised by series connected resistors 58–61 of which the resistor 61 is manually adjustable for purposes presently to be explained. The two amplifier stages 46 and 54 just described are energized by the positive potential developed at the output circuit conductor 24 of the power supply system earlier described and are decoupled by a conventional decoupling network comprised by a series resistor 62 and shunt condenser 63. Temperature stability exerted on the second amplifier stage 54 by a thermistor 64 connected across the bias network resistor 60 as shown improves the system stability as explained more fully hereinafter.

The further amplified error signal of the amplifier stage 54 is directly applied through a conductor 67 to the base electrode 68 of a PNP transistor 69 included in an amplifier stage 70 having an emitter bias network comprised by a resistor 71 and shunt condenser 72 and having a collector load resistor 73. The amplifier stages 54 and 70 are energized by the positive unidirectional potential developed in the output circuit conductor 24 of the power supply system earlier described, and the unidirectional potential of the collector electrode of the transistor 53 with the amplified error signal superimposed upon this potential controls the instantaneous value of the potential applied to the base electrode 68 of the transistor 69 and thus controls the instantaneous value of collector current of the latter. A portion of this collector current charges an energization-control condenser 74 through a series resistor 75. The unidirectional component of potential supplied by the amplifier stage 54 to the base electrode 68 of the transistor 69 in controlling the collector current of the latter affects the rate of charge of the condenser 74, but is controlled for a purpose presently to be explained by a negative feed-back loop utilized in the system and described hereinafter. The amplified error signal supplied by the transistor stage 54 to the base electrode 68 of the transistor 69, however, affects the charge of the condenser 74 differentially according to successive half cycles of the amplified error signal. To this end, gain of the transistor stage 70 is preserved for the error signal by the bias-network shunt condenser 72.

To insure that each half cycle charge of the condenser 74 begins at a fixed reference potential level, the background potential developed at the conductor 36 by the positive-potential and negative-potential power supply systems and represented by curve D earlier described is applied through a diode rectifier 76 to the ungrounded terminal 77 of the condenser 74 and a diode rectifier 78 is connected with the conductive polarity shown between the terminal 77 and ground. The instantaneous potential of the conductor 36 has a negative value, adjusted by manual adjustment of the resistor 35, at the beginning and end of each half cycle of the phase reference alternating current supplied to the input terminals 12 of the power transformer 10 and this negative value of potential renders the diode rectifiers 76 and 78 conductive in series with one another. This has the result that the diode rectifier 78 maintains the condenser terminal 77 negative with respect ground potential until the expiration of an essentially constant relatively small value of time delay following the initiation of each half cycle of the phase reference alternating current. After this small delay interval, the potential of the conductor 36 becomes positive relative to ground potential as represented by curve D so that the diode rectifiers become non-conductive and the condenser 74 begins to be charged to a positive potential by the collector current of the transistor 69. Such charging of the condenser 74 occurs during each successive half cycle of the phase reference alternating current.

For the assumed condition that the error signal has zero amplitude value, the rate of charge of the condenser 74 by the collector current of the transistor 69 will be the same in successive half cycles of the phase reference alternating current. The condenser 74 accordingly develops at the terminal 77 a charge voltage represented by curve G. This voltage is applied to the emitter electrode 79 of a unijunction transistor 80. The latter has a first base electrode 81 (conventionally identified as B–1) coupled through series-connected resistors 82 and 83 to ground potential and has a second base electrode 84 (conventionally identified as B–2) energized through a resistor 85 from the power supply output circuit conductor 24. When the charge voltage of the condenser 74 reaches a preselected value represented by voltage $V_1$ in association with curve G of FIG. 2, the unijunction transistor 80 becomes conductive for a short interval rapidly to discharge the condenser 74 as represented by the partion $G_1$ of curve G. The emitter 79 of the unijunction transistor 80 ceases to emit after a brief interval and the condenser 74 thereupon begins to charge once more. However, its change voltage can only rise to the point where it is equal to the instantaneous value of the potential developed on the conductor 36 since any larger value of charge voltage will render the diode rectifier 76 conductive. Thereafter the conductive state of the diode rectifier 76 discharges the condenser 74 and causes its terminal voltage to follow the instantaneous potential of the conductor 36. At the end of each half cycle, the condenser 74 becomes charged to the small negative reference-level potential of the conductor 36 by reason of the conductive state of the diode rectifier 78.

Assume there is now applied to the input transistor stage 46 an error signal represented by curve E of FIG. 2 and having the same phase as the phase reference alternating current applied to the input terminals 12 of the transformer 10. The amplified error signal causes the collector current of the transistor 69 to have a lesser peak amplitude value during the first half cycle (0°–180°) of the phase reference alternating current and to have a larger peak amplitude value of collector current during the second half cycle (180°–360°) of the phase reference alternating current. Thus for this error signal the condenser 74 differentially charges at a slower charging rate during the first half cycle and at a faster charging rate during the second half cycle as represented by curve H of FIG. 2. Accordingly the first half cycle charge voltage of the condenser 74 is limited by the conductive state of the diode rectifier 76 (beginning at point X of curve H) before it reaches the preselected level $V_1$ required to render the unijunction transistor 80 conductive. The second half cycle higher charging rate, however, causes the charge voltage to reach the level $V_1$ earlier than would occur were the error voltage to have zero amplitude as last described in connection with curve G. By reason of this, and as represented by curve H, the unijunction transistor 80 is rendered conductive (as early as 270° with a larger amplitude error signal) in the second half cycle but is not rendered conductive during the first half cycle as just explained. Assume now that the error signal has opposite phase to the phase reference alternating current applied to the input terminals 12 of the transformer 10, as represented by curve F of FIG. 2. It will be evident that the condenser 74 is now charged more rapidly during the first half cycle at a charge rate increasing with the amplitude of the error signal and may reach the charge voltage level $V_1$, required to render the unijunction transistor 80 conductive, as early as 90° in such half cycle as represented by curve I of FIG. 2. However, the condenser 74 now is charged more slowly during the second half cycle of the error signal and its charge voltage is limited by the conductive state of the diode rectifier 76 (beginning at point $X_1$ of curve I) before it reaches the charge voltage level $V_1$ required to render the unijunction transistor 80 conductive. With an error signal of either phase, however, the condenser 74 is discharged at the end of each half cycle to the reference negative voltage established by the potential of the conductor 36 and by the conductive state of the diode rectifiers 76 and 78 in the manner earlier explained.

When the emitter electrode 79 of the unijunction transistor 80 causes the latter to become conductive, the resistance between its base electrodes 81 and 84 abruptly decreases and a potential pulse is thereupon developed across the resistors 82 and 83. For the condition that the error signal has zero amplitude, and by reason of which the charge voltage of the condenser 74 reaches the preselected charge voltage level $V_1$ (required to render the transistor 80 conductive) during approximately each of successive half cycles of the phase reference alternating current, the half cyclic resultant potential pulses developed across the resistor 83 are as represented by curve J of FIG. 2 and occur late in each half cycle. For an error signal having the phase relationship represented by curve E, the unijunction transistor 80 is rendered conductive in the second half cycle of the error signal as previously explained in relation to curve H and the resultant potential pulse developed across the resistor 83 is that represented by curve K of FIG. 2. For an error signal having a phase relationship represented by curve F, the unijunction transistor 80 is rendered conductive in the first half cycle of the error voltage as explained in connection with curve I and the resultant potential pulses developed across the resistor 83 are represented by curve L of FIG. 2.

The potential pulses developed across the resistor 83 are applied concurrently to the gate electrode 88 of a silicon control rectifier 89 and to the gate electrode 90 of a silicon control rectifier 91. The silicon control rectifier 89 is included in a series energizing circuit of a servo motor M of the direct current type, the energizing circuit including a diode rectifier 92 connected with the polarity shown to be rendered conductive when the rectifier 89 becomes conductive, a secondary winding 93 of the power transformer 10, and the motor M. The silicon control rectifier 91 is similarly included with a diode rectifier 94 in the energizing circuit last mentioned, the diode rectifier 94 having the polarity shown to be rendered conductive when the rectifier 91 becomes conductive. The alternating potential of the transformer secondary winding 93 applies a positive poliraty potential through the energizing circuit to the anode of the silicon control rectifier 89 on one half cycle of the phase reference alternating current supplied to the transformer terminals 12, and applies a positive polarity potential to the anode of the silicon control rectifier 91 during the succeeding half cycle of the phase reference alternating current. The potential pulses developed across the resistor 83 by the unijunction transistor 80 accordingly cause one or the other of the silicon control rectifiers 89 and 91 to be rendered abruptly conductive depending upon which of the rectifiers has a positive potential applied to its anode by the transformer secondary winding 93 at the time of occurrence of the pulse.

Figure 2A:
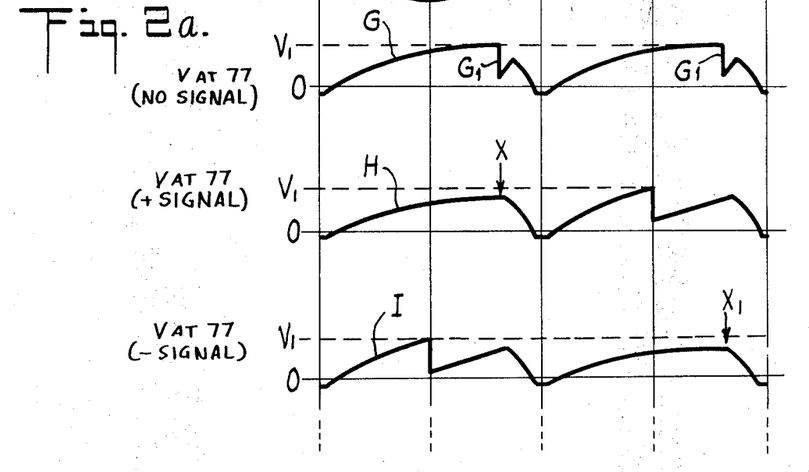
Figure 2B:
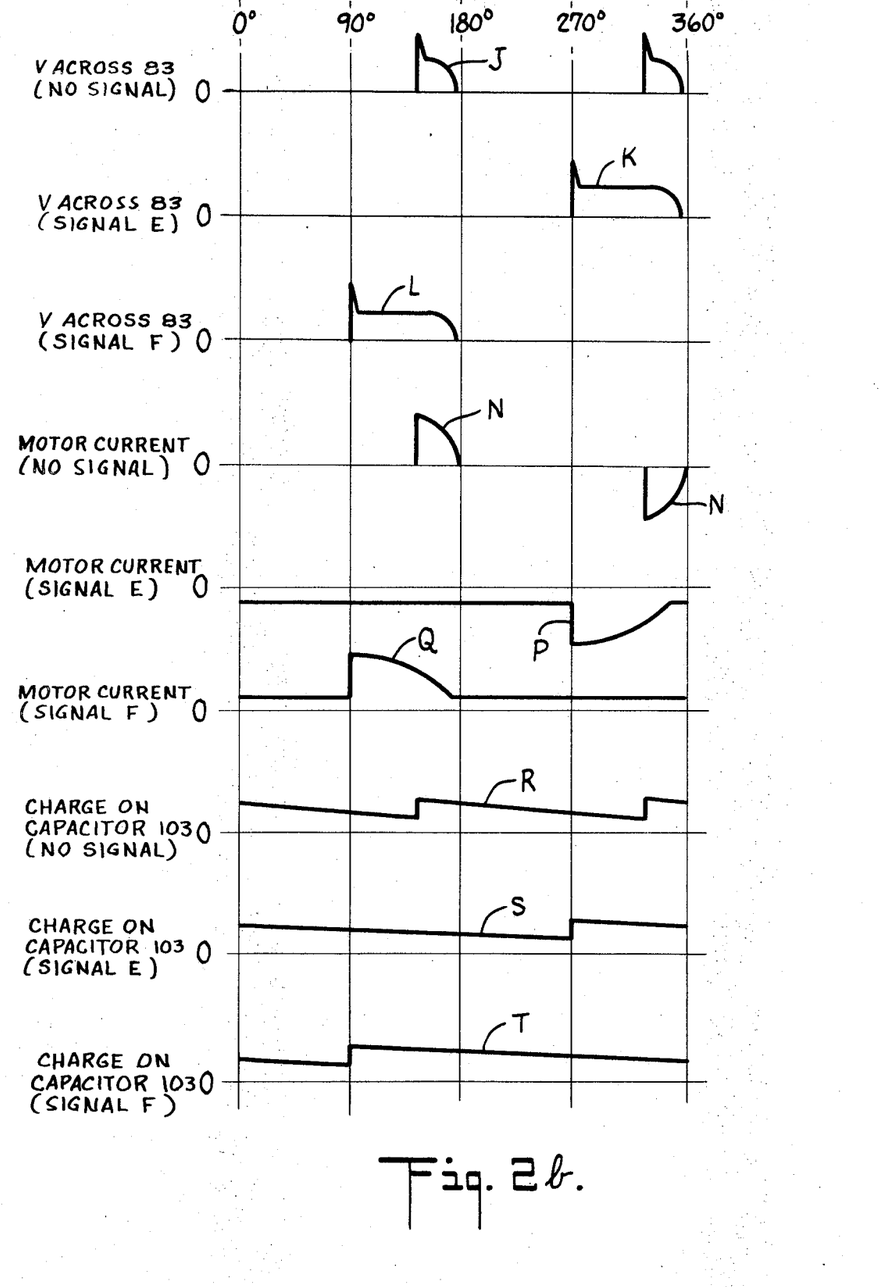

Thus for the condition that the error signal has zero amplitude and by reason of which potential pulses are developed across the resistor 83 during approximately successive cycles of the phase reference alternating current, the silicon control rectifiers 89 and 91 are rendered abruptly conductive during approximately successive half cycles and accordingly supply to the servo-motor M oppositely flowing pulses of energizing current as represented by curve N of FIG. 2b. These oppositely flowing pulses tend to make the servo-motor M run alternately in opposite directions of its rotation, but the motor does not rotate in either direction and as noted above the resulting impact effect on the motor is quite effective in overcoming any starting friction in the motor and the load which it drives. For an error signal having the phase relationship represented by curve E of FIG. 2a, and which results in the production of control pulses across the resistor 83 in alternate half cycles of the error signal as explained in connection with curve K, energizing current pulses flowing only in one direction through the servo-motor are produced by the conductive state of one of the silicon control rectifiers 89 or 91 as represented by curve P of FIG. 2b and the motor accordingly rotates in one direction. The horizontal portion of curve P represents the counter electromotive force of the now rotating motor. It will be evident from the foregoing that an error signal having the phase represented by curve F will cause the other of the silicon control rectifiers 89 or 91 to energize the servo-motor M with alternate half cycle unidirectional energizing pulses such as represented by curve Q of FIG. 2, thus causing the motor to rotate in opposite direction. Here again the horizontal portion of curve Q represents the counter electromotive force of the now rotating motor. Thus the phase of the error signal is effective to select the direction of rotation of the servo-motor M while the amplitude of the error signal, by varying the rate of charge of the condenser 74, is effective to control the magnitude of energization of the servo-motor when rotating in either direction.

As indicated by the broken line in FIG. 1, the shaft of the servo-motor M is mechanically connected through step-down gearing 95 to the carriage 42 of the transducer 39 to cause the primary windings 40 and 41 of the latter to follow movements of the secondary windings 38 and thereby reduce the amplitude of any error signal to zero value. By mechanically connecting the motor shaft to an indicator such as a cyclometer type counter 96, the position of the carriage 42 of the transducer 39 is indicated thereby indicating the value of the condition measured by the measuring device 37 without the need for the latter itself to exert any indicator drive force.

The bias resistor 61 of the amplifier stage 54 is manually adjusted to a value such that the resultant base bias of the transistors 53 and 69 keeps the silicon control rectifiers 89 and 91 pulse energizing the servo-motor M roughly on the average of one each full cycle of the reference phase alternating current at a time when the error signal has zero amplitude. A negative feed-back loop is provided automatically to maintain this character of operation. This loop includes a transformer 97 having a primary winding 98 coupled by a condenser 99 across the terminals of the servo-motor M and having a center tapped secondary winding 100 coupled through a full wave rectifier system comprising diode rectifiers 101 and 102 to charge a condenser 103 which has one terminal connected to ground as shown and its opposite terminal connected through a resistor 104 to the bias network 55, 56 of the amplifier stage 54. An energizing current pulse supplied to the servo-motor M by either of the silicon control rectifiers 89 and 91 will cause corresponding pulse energization of the primary winding 98 of the transformer 97. The resulting pulse in the secondary winding 100 of the transformer 97 is rectified by the diode rectifier 101 or 102 to place a positive potential charge increment in the condenser 103. A succession of energizing pulses supplied by the silicon control rectifiers 89 and 91 to the servo-motor M will cause the charge potential of the condenser 103 to increase in proportion both to the ratio of the number of half cycles of motor energization to the number of half cycles of its deenergization and to the half-cycle amplitude and duration of the motor current pulses. Thus for an error signal of zero amplitude, the charge increments of the condenser 103 may be represented by curve R of FIG. 2b whereas curves S and T of FIG. 2b represent the condenser charge increments for an error signal of phase relationship respectively represented by curves E and F of FIG. 2a. While the charging circuit of condenser 103, as is obvious from FIG. 1, has a low resistance and hence a short time constant, that condenser 103 discharges through the resistors 104 and 55 in a series, so that its discharge circuit has a relatively longer time constant. It will be evident that should neither of the silicon rectifiers 89 or 91 become conductive during one or more cycles of the phase reference alternating current the decreasing charge of the condenser 103 allows a corresponding decrease of the emitter bias voltage of the transistor 53. This decreased emitter bias increases the collector current of the transistor 53 thereby lowering the unidirectional bias voltage applied to the base electrode 68 of the transistor 69. The resulting increased collector current of the transistor 69 effects an increase of the charging current supplied to the condenser 74 and thereby effects more frequent emitter conduction of the unijunction transistor 80 with corresponding increase of frequency of pulse energization of the servo-motor M. Since the feed-back pulses developed in the secondary winding 100 of the transformer 97 vary with the amplitude and duration of the servo-motor energizing current pulses, the negative feed-back loop in a practical application may provide regulation of the frequency of current pulse energizations of the servo-motor M within a range of approximately ten energizing pulses per second to one hundred and twenty energizing pulses per second and readily attains an optimum of sixty energizing pulses per second for an error signal of zero amplitude. The foregoing statement assumes that the supply frequency is 60 cycles per second.

An important operational advantage results from the discharge of the condenser 74 by the conductive state of the diode rectifier 76 near the end of each half cycle of the reference phase alternating current. Thus the condenser during the next half cycle starts to charge from the same reference potential level and at the same time phase angle regardless of what happened during the previous half cycle. This assures that the unijunction transistor 80 either becomes conductive at or before the time in the half cycle at which discharge of the condenser 74 begins or does not become conductive at all during that half cycle. The result is an appreciable pulse of energizing current to the motor M or none at all during a given half cycle. Once the unijunction transistor 80 fails to become conductive during a half cycle, the condenser 103 fails to receive a charge increment and its charge voltage falls to reduce the negative feed-back (the emitter current of the transistor 53 decreasing and that of the transistor 69 increasing) and make it still easier for the condenser 74 during the next half cycle to be charged to a sufficiently high charge voltage as to render the unijunction transistor 80 conductive during this next half cycle. On the other hand, a motor energizing pulse during one half cycle places an incremental charge in the condenser 103 which persists in some degree during the next half cycle slightly to decrease the emittter current of the transistor 69. This increased negative feed-back has the opposite effect to that last mentioned. The result of this is to make the system highly sensitive to effect conductivity of the unijunction transistor 80 entirely during half cycles of one polarity or entirely during half cycles of opposite polarity of the reference phase alternating current in response to the slightest increase of amplitude of the error signal from zero value. Once this operational condition occurs the servo-motor M is suppled with approximately the same number of energizing pulses per second but these pulses all flow through the motor in only one direction rather than being half in one direction and half in the other. Even though an error signal of small amplitude cannot appreciably increase the pulse duration of the unidirectional pulses supplied to the motor M, the balance of opposite direction bucking energizing pulses produces a motor torque far beyond proportionality with the amplitude of the error signal. The energizing pulse minimum duration is selectable by manual adjustment of the resistor 35 which raises or lowers the level of the voltage developed on the conductor 36 and thereby controls the time in each half cycle at which the instantaneous amplitude of this voltage causes the diode rectifier 76 to become conductive and initiate discharge of the condenser 74. Thus the minimum power pulse to the motor M can be readily adjusted for optimum operation depending upon the inertia of the motor armature and its mechanically coupled load.

The negative feed-back loop last described provides an extent of compensation of the system operational characteristics for changes of ambient temperature, variations of energizing voltage applied to the primary winding 11 of the transformer 10, and component aging. Improved temperature stability is effected by the use of the thermistor 64 to regulate the value of unidirectional bias voltage selected by manual adjustment of the resistor 61 to be applied to the base electrode 52 of the transistor 53 and by which the unidirectional operating bias voltages of all of the transistors 53, 69 and 80 are regulated to compensate for the changing characteristics of these transistors and their associated components with changes of temperature. Since certain of these temperature affected changes as well as the value of resistance of the thermistor 64 vary in non-linear manner with temperature, the relative values of the thermistor 64 and the resistors 59 and 60 may readily be so selected as to attain system compensation over a wide temperature range.

In a practical embodiment of the invention of the FIG. 1 form, the ratio of the gears 95 was such that one-tenth rotation of the shaft of the motor M displaced the secondary winding 38 three millionths of an inch from the center of symmetry of the magnetic fields of the primary windings 40 and 41. Such displacement developed an error signal of approximately six tenths r.m.s. microvolt amplitude which was adequately large, due to the high operational sensitivity of the servo system, substantially to effect a corresponding three millionths inch motor-drive follower displacement of the follower carriage structure 42 once more to place the secondary winding 38 substantially at the center of magnetic field symmetry. This displacement produced a one-tenth digit change of indication of the indicator 96. In this embodiment approximately two-tenths r.m.s. millivolt error signal was developed by a one thousandth inch displacement of the winding 38 from the center of magnetic field symmetry and this amplitude of error signal caused one of the silicon control rectifiers 89 and 91 to become conductive 90° after the beginning of a half cycle of the reference phase alternating current supplied to the input terminal 12.

Figure 3:
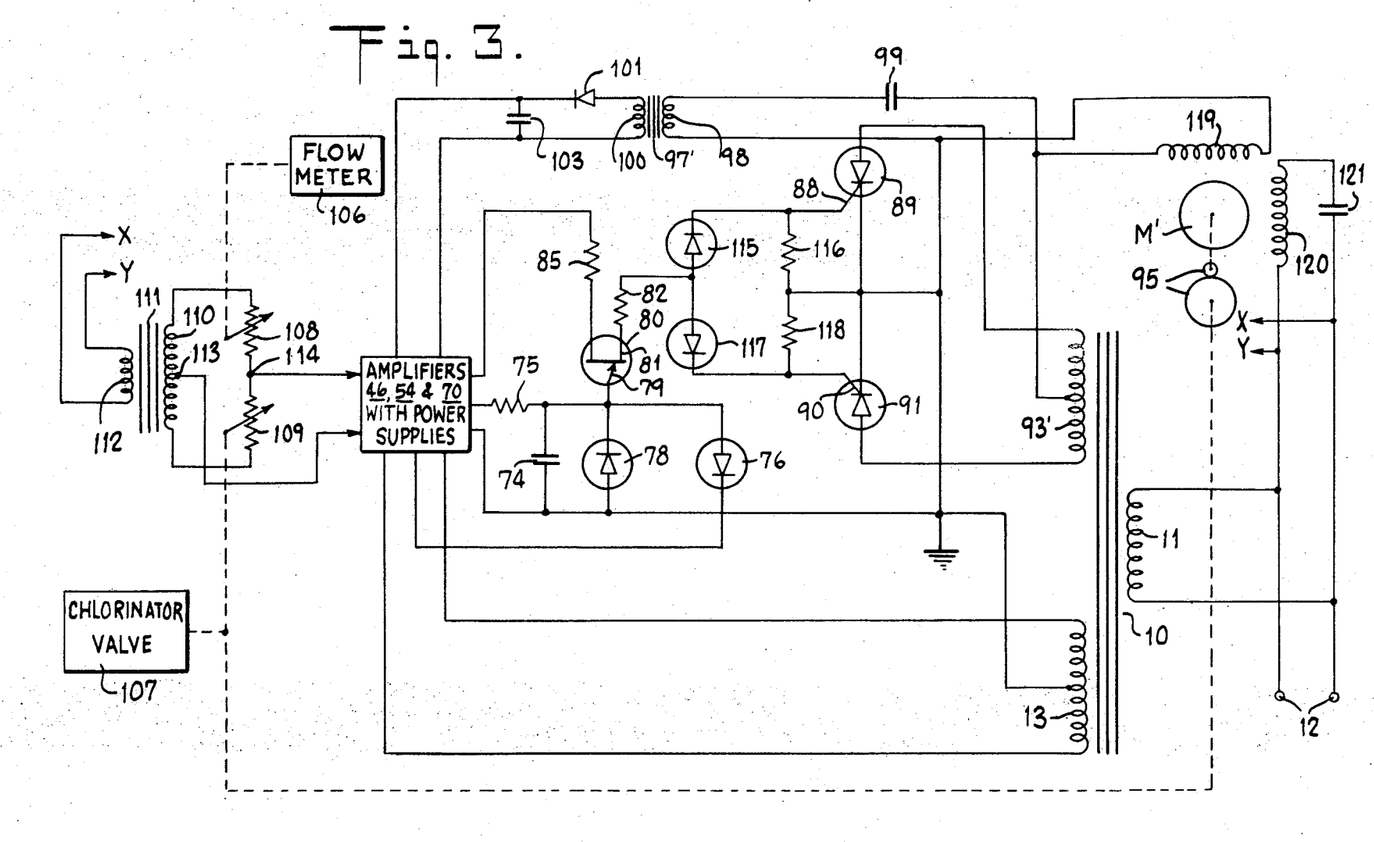
FIG. 3 is an electrical circuit diagram, partly schematic, representing a high gain electrical servo-motor system embodying a modified form of the invention.

FIG. 3 is an electrical circuit diagram, partly schematic, representing a high gain electrical servo-motor system illustrating a modified form of the invention in a servo syste messentially similar to that of FIG. 1, similar circuit elements being designated by similar reference numerals and analogous elements by similar reference numerals primed. By way of illustration, this modified form of servo system is represented as one useful in a water chlorinator control system wherein changes of the quantity of water flow as inricated by a flow meter 106 automatically effect a change of the quantity of chlorine introduced into the water flom under control of a chlorinator valve 107. The flow meter 106 adjusts the value of a resistor 108 according to the indicated quantity of water flowing, and the quantity of chlorine injected into the water flow varies with the setting of the chlorinator valve 107 which concurrently adjusts the value of a resistor 109 according to such setting. The resistors 108 and 109 comprise arms of an alternating current Wheatstone bridge having as its other arms the two halves of a secondary winding 110 of a transformer 111 provided with a primary winding 112 energized by the reference phase alternating current supplied to the input terminals 12. An error signal is developed between the center tap 113 of the transformer secondary winding 110 and the juncture 114 of the resistors 108 and 109 whenever the bridge becomes unbalanced by any inequality of the values of the resistors 108 and 109. The error signal has an amplitude varying with the extent of bridge unbalance and has a phase which is either the same as or opposite to the reference phase alternating current according to the sense of unbalance of the bridge.

This error signal is amplified by the amplifier stages 46, 54 and 70 to effect half cyclic charge of the condenser 74 74 as in the FIG. 1 arrangement earlier described, the charge voltage of the condenser controlling the unijunction transistor 80 as before explained. The first base electrode 81 of the transistor 80 is coupled to ground through the resistor 82 and either of two parallel paths, one comprising a diode rectifier 115 and a resistor 116 and the other path comprising a diode rectifier 117 and a resistor 118. Each time that the emitter 79 of the transisor 80 is rendered emissive by he charge voltage of the condenser 74 in the manner earlier described, control potential pulses are concurrently developed across the resistors 116 and 118 with positive polarities in relation to ground potential and these pulses are applied to individual ones of the gate electrodes 88 and 90 of the respective silicon control rectifiers 89 and as one of the two-phase alternating current type having a control field winding 119. The latter has one terminal connected to a center tap of the transformer secondary winding 93' which has its end terminals connected to the anodes of the silicon control rectifiers 89 and 91 as shown. 91. The servo-motor M' is here shown by way of example The other terminal of the control winding 119 is connected to the cathode electrodes of the silicon control rectifiers 89 and 91 as shown. The primary winding 98 of the feedback transformer 97' is coupled by the condenser 99 in shunt to the control winding 119. The motor M' has a power field winding 120 energized through a phase shifting condenser 121 from the reference phase alternating current supplied to the input terminals 12, the size of the condenser 121 being selected in conventional manner such that the magnetic field developed in the motor by current flowing through the power winding 120 has 90° or quadrature relation to the field developed by current flowing through the control winding 119. For an error signal of zero amplitude, the silicon control rectifiers 89 and 91 are on the average rendered conductive effectively during a small terminal portion of each of successive half cycles of the reference phase alternating current and thereby on the average supply successive half cycle pulses of energizing current to the motor field winding 119. The energizing pulses supplied to the field winding 119 by the silicon control rectifier 89 coincide with half cycles of one polarity of the phase reference alternating current supplied to the input terminals 12 and thus produce a magnetic field which lags or leads by 90° that produced during such half cycles of one polarity by the current flowing through the winding 20. Similarly the energizing pulses supplied to the field winding 119 by the silicon control rectifier 91 coincide with half cycles of opposite polarity of the phase reference alternating current and thus produce a magnetic field which leads or lags by 90° that produced during half cycles of such opposite polarity by the current flowing through the winding 20. The half cycle pulses thus supplied at this time to the field winding 119 by both of the silicon control rectifiers 89 and 91 tend to cause the motor M' to rotate in opposite directions. While the motor when so energized does not rotate in either direction, the resulting impact effect of these energizing pulses on the motor is highly effective in overcoming any starting friction of the motor and its driven load.

As in the arrangement of FIG. 1, an error signal of one phase will effect such differential half cyclic charging of the condenser 74 as to cause one of the silicon control rectifiers 89 or 91 to become conductive during alternate half cycles of the reference phase alternating current and thereby supply energizing pulses to the motor field winding 119 to cause rotation of the motor in one direction. An error signal of opposite phase will correspondingly cause the other of the silicon control rectifiers 89 or 91 to become conductive during alternate cycles and supply energizing pulses through the field winding 119 to cause rotation of the motor M' in opposite direction. As indicated by the broken line, the shaft of the servo-motor M' is mechanically connected through step-down gearing 95 to adjust the setting of the chlorinator valve 107 such as to maintain injection of a quantity of chlorine proportional to the water flow as indicated by the flow meter 106, this adjustment of the valve 107 effecting a concurrent adjustment of the resistor 109 in a direction and to an extent sufficient to effect and maintain the alternating current bridge in balance thereby to reduce to zero the amplitude of the error signal. The operation of the FIG. 3 servo-motor system is otherwise the same as that described in connection with FIG. 1 and will not be repeated.

Figure 4:
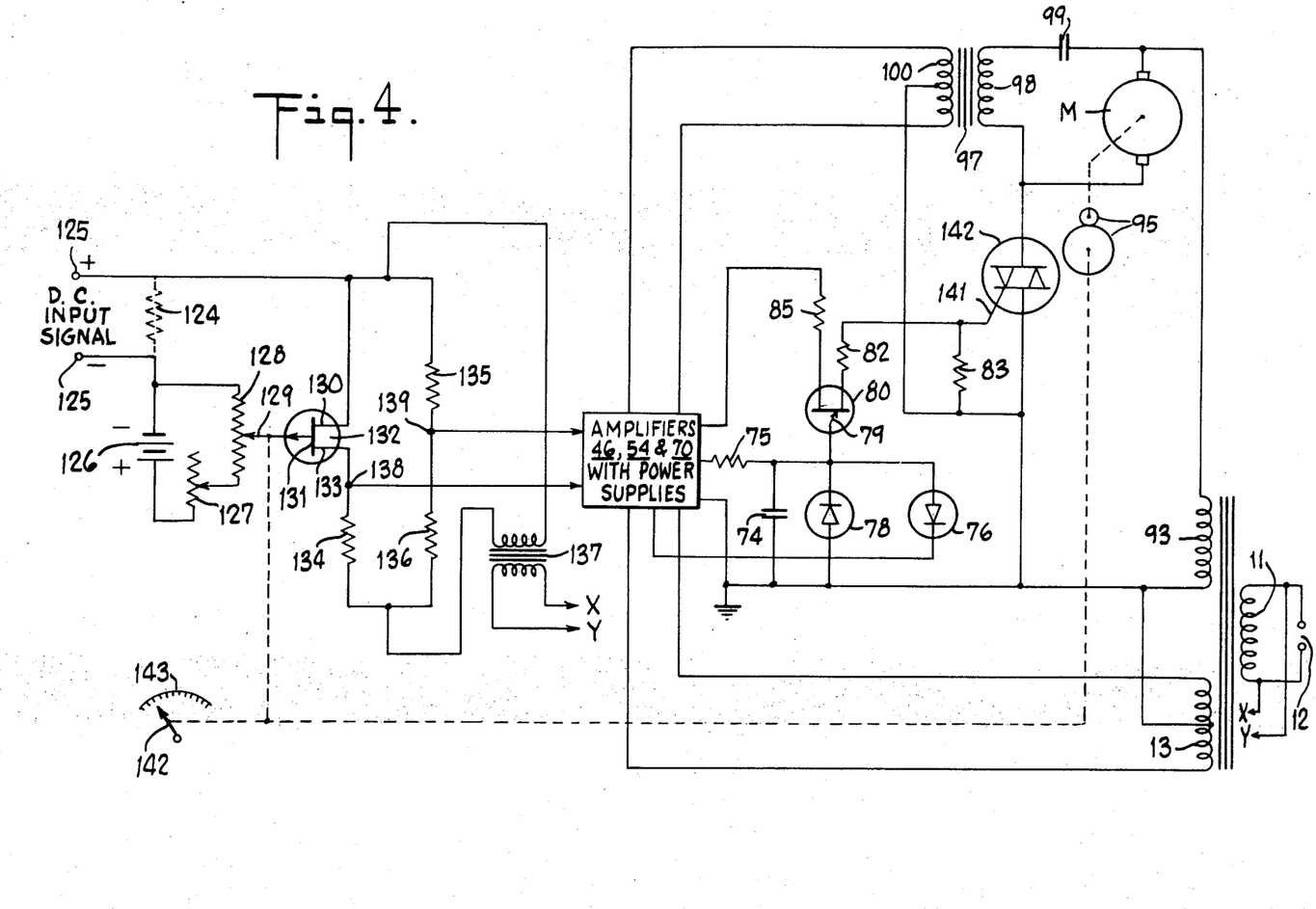
FIG. 4 is a circuit diagram of an electrical servo-motor system embodying the invention in an additionally modified form.

FIG. 4 is an electrical circuit diagram, partly schematic, of an electrical servo-motor system embodying the invention in a form suitable for indicating the prevailing amplitude of a unidirectional electrical current or voltage. This system is essentially similar to the FIG. 1 system, and similar circuit components are identified by similar reference numerals. If the amplitude of an electrical current is to be indicated, a resistor 124 shown in broken lines is connected across a pair of input terminals 125 to which the current is supplied; the resistor 124 may be omitted if the amplitude of an electrical voltage supplied to the input terminals 125 is to be indicated. The current or voltage to be indicated is supplied to the input terminals 125 with the polarity shown, and there is provided a source of opposing-polarity voltage shown by way of example as comprised by a battery 126 connected through a manually adjustable resistor 127 across the terminals of the resistive element 128 of a conventional potentiometer having a slider 129 movable along the length of the element 128. The prevailing adjusted positioned of the slider 129 selects, with respect the negative terminal of the resistive element 128, a selectable value of voltage which has opposite polarity to and thus opposes the voltage applied to the input terminals 125 or developed across the resistor 124. The net value of these opposing voltages, with net positive or negative polarity, is applied between a source electrode 130 and a base electrode 131 of a conventional field effect transistor 132. The latter has a drain electrode 133, and exhibits between its electrodes 130 and 133 a base-bias controllable value of resistance which is included with a resistor 134 in a first branch of a resistive Wheatstone bridge having a second branch comprised by resistors 135 and 136 as shown. This bridge is energized by alternating current supplied from the input terminals 12 through a transformer 137. Whenever the bridge becomes unbalanced by reason of a prevailing net value of the opposing voltages applied between the source electrode 130 and base electrode 131 of the transistor 132, an error output alternating voltage is developed at the diametric bridge output points 138 and 139. The error voltage has an amplitude increasing with the extent of bridge unbalanced in either direction, and has a phase with respect the reference-phase alternating current at the input terminals 12 which is established by the direction of bridge unbalance.

This error alternating voltage after amplification differentially controls the half-cycle charge of the condenser 74 as described in relation to FIG. 1, and the half-cycle charge voltage of the condenser controls the periodic conductivity of the unijunction transistor 80 in the manner earlier explained to develop control potential pulses across the resistor 83. These potential pulses are applied to the gate electrode 141 of a gate controlled alternating current switch device 142, conventionally called a "Triac," which operates in the same manner as the FIG. 1 silicon control rectifiers 89 and 91 with associated diode rectifiers 92 and 94 to effect controlled bi-directional energization of the reversible direct current servo-motor M for rotation in one direction or the other.

The motor M is mechanically connected, as indicated by the broken line, through the step-down gearing 95 to adjust the potentiometer slider 129 along the length of the resistive element 128. The resistor 135 is selected to have a vale of resistance somewhat greater than the unbiased source-drain electrode resistance of the transistor 132 so that back biasing of the base 131 in relation to the source electrode 130 of the latter exactly matches the source-drain resistance value with that of the resistor 135 in which condition the bridge is balanced and there is no error output voltage. With the input terminals 125 temporarily short-circuited, the value of back bias of the transistor 132 is adjusted by manual adjustment of the resistor 127 such that the servo-motor M drives the potentiometer slider 129 to its exact zero position as indicated by servo-motor positioning of a driven pointer 142 to the zero scale point of an associated indicating scale 143. Thereafter any voltage applied to the input terminals 125 or developed across the resistor 124 will control the base potential of the transistor 132 to effect, by resultant bridge unbalance, such servo-motor drive positioning of the potentiometer slider 129 as to maintain a state of bridge balance and consequent absence of an error output voltage. Such prevailing value of input voltage will then be indicated by the position of the indicator pointer 142 in relation to the indicating scale 143.

It will be apparent from the foregoing description of the invention that an electrical motor control system embodying the invention has such stability of its operating characteristics and such high sensitivity to an applied electrical control signal as to enable a high degree of sensitive control over both the selection of one of two directions of rotation of the motor and over the magnitude of power energization of the motor in each such selected direction of rotation. The invention has particular utility in providing a high gain electrical servo-motor system of the closed loop type useful in effecting the positioning of a movable follower member with a high degree of precision and in response to a small electrical control signal generated by a movable member to be followed, and one in which the precision of such positioning is relatively unaffected by prevailing operating conditions such as changes of ambient temperature, changes of power supply energizing voltage, and aging of components of the system. A servo system embodying the invention has the additional advantages that it provides a system of simple and relatively inexpensive construction and one which is suitable for a variety of applications utilizing either a direct-current or an alternating-current servo-motor as desired while providing for either type of motor such sensitivity of control by an electrical control signal as to insure appreciably greater power energization of the motor than would be effected in direct proportion to the amplitude of the control signal which may be of either the unidirectional or alternating current or alternating potential type.

While there have been described for purposes of illustration specific forms of the invention, it is contemplated that numerous changes may be made without departing from the spirit of the invention.

What is claimed is:
1. A high sensitivity electrical motor control system adapted for connection to a source of alternating current of fixed frequency and phase, comprising:
   (a) an electrical motor having a winding and operable in opposite directions selectively in accordance with the instantaneous polarity of current supplied to said winding;
   (b) an energizing circuit for the motor including a pair of conductance control means connected in series between the source and the winding and selectively operable at any instant during any half-cycle of the source to initiate energization of the winding with current of the polarity then available at the source and to maintain that energization only until the end of that half-cycle;
   (c) means for producing at times an alternating control potential having a phase selectable with respect to the source phase in accordance with the desired direction of motor operation and an amplitude selectable to determine the desired power energization of the motor;
   (d) threshold responsive control means connected to said conductance control means and effective when energized with a potential more positive than a predetermined threshold potential to make one of said conductance control means conductive; and
   (e) means operatively connecting said control potential producing means to said threshold responsive control means;
   (f) an energization control condenser;
   (g) means connecting one terminal of the condenser to a source of fixed potential; and
   (h) means connecting the other terminal of the condenser to said threshold responsive control means; wherein the improvement comprises:
   (i) means for controlling the charge on said condenser, including:
      (1) means for deriving from said current source a condenser discharge limiting potential varying at twice the source frequency and having a fixed value at the beginning of each half-cycle of the source substantially more negative than said threshold potential and the form of sub- tainlly the positive half of a sinusoidal wave throughout each half-cycle of the source;

(2) means including an asymmetrically conductive element connecting said other terminal of the condenser to said means for deriving a condenser discharge limiting potential, said element being conductive only when said other terminal has a potential more positive than said limiting potential;

(3) feedback means supplied from said motor energizing circuit, operatively connected to said other terminal of the condenser, and responsive to energization of the motor circuit for operation in either direction to supply to said other terminal a potential acting in a sense to decrease the charge on the condenser and thereby to decrease the potential of said other terminal below said threshold potential;

(4) bias control means cooperating with said condenser discharge limiting potential deriving means in the absence of an alternating control potential to control the potential of said other terminal of the condenser so as to energize said motor winding with substantially equal pulses during successive half-cycles, said pulses acting alternately in opposite senses, so that the motor produces torque pulses alternately acting in opposite directions but does not rotate substantially;

(5) said alternating control potential being effective when present to swing the potential of said other terminal above said threshold potential during one set of alternate half-cycles and to swing said potential substantially below the threshold during the other set, so that the motor rotates in a direction selected by the phase of the control potential and with power varying as a function of the amplitude of the control potential.

2. A high sensitivity electrical motor control system as defined in claim 1, in which said means for deriving a condenser discharge limiting potential comprises;

(a) a first full wave rectifier connected to said source and effective to produce a unidirectional potential of positive polarity;

(b) a second full wave rectifier connected to said source and effective to produce a unidirectional potential of negative polarity;

(c) voltage divider impedance means connecting the outputs of said rectifiers; and (d) a terminal in said voltage divider impedance means at which said limiting potential appears.

3. A high sensitivity electrical motor control system according to claim 1, in which said means for controlling the charge on the condenser includes a second asymmetrically conductive element connecting said source of fixed potential to said other terminal of the condenser, said second element being asymmetrically conductive with respect to said other condenser terminal in the opposite direction from the first-mentioned element.

4. A high sensitivity electrical motor control system according to claim 1, in which said feedback means comrises:

(a) a feedback energy storage condenser;

(b) means for charging said storage condenser with pulses of energy corresponding in amplitude and duration to the discrete pulses of energization of said motor; and (c) means operatively connecting said storage condenser to said energization control condenser.

5. A high sensitivity electrical motor control system according to claim 4, wherein:

(a) said means for charging the storage condenser has a relatively short time constant; and (b) said means connecting the storage condenser to the energization control condenser has a relatively longer time constant.

References Cited

UNITED STATES PATENTS

| | | | |
|---|---|---|---|
| 3,150,303 | 9/1964 | James et al. | 318—20.835 |
| 3,327,186 | 6/1967 | Gregory et al. | 318—20.835 |
| 3,369,160 | 2/1968 | Koppel et al. | 318—20.835 X |
| 3,424,959 | 1/1969 | Gruner | 318—20.835 X |

THOMAS E. LYNCH, Primary Examiner

U.S. Cl. X.R.

318—28, 448

UNITED STATES PATENT OFFICE
CERTIFICATE OF CORRECTION

Patent No. 3,517,284          Dated June 23, 1970

Inventor(s) George M. Booth

It is certified that error appears in the above-identified patent and that said Letters Patent are hereby corrected as shown below:

Col. 8, line 41, "balance" should read -- absence --.

Col. 9, lines 19-20, "terminal 12" should read -- terminals 12 -- line 24 "syste messentially" should read -- system essentially --;

line 30, "inricated" should read -- indicated --;

line 32, "flom" should read -- flow --;

line 55, "74" should be deleted;

line 62, "transisor" should read -- transistor --;

line 63, "he" should read -- the --;

line 74, reading as follows: -- 91. The servo-motor M' is here shown by way of example -- has been misplaced and should follow line 68, which reads "88 and 90 of the respective silicon control rectifiers 89 and --.

SIGNED AND SEALED

JAN 5 1971

(SEAL)
Attest:

Edward M. Fletcher, Jr.
Attesting Officer

WILLIAM E. SCHUYLER, JR.
Commissioner of Patents